United States Patent [19]

Jarrett et al.

[11] 4,272,734
[45] Jun. 9, 1981

[54] DUAL REFERENCE INTERFEROMETER FOR DYE LASER STABILIZATION

[75] Inventors: Steven M. Jarrett, Los Altos; Harold D. Du Bose, Sunnyvale, both of Calif.

[73] Assignee: Spectra-Physics, Inc., Mountain View, Calif.

[21] Appl. No.: 43,466

[22] Filed: May 29, 1979

[51] Int. Cl.³ .............................................. H01S 3/13
[52] U.S. Cl. ................................................ 331/94.5 S
[58] Field of Search .................. 331/94.5 C, 94.5 S, 331/94.5 L; 356/346, 352

[56] References Cited

U.S. PATENT DOCUMENTS

| 3,977,788 | 8/1976 | Moore | 356/352 |
| 4,165,183 | 8/1979 | Hall et al. | 356/346 |
| 4,194,168 | 3/1980 | Jarrett et al. | 331/94.5 C |

Primary Examiner—William L. Sikes
Assistant Examiner—Léon Scott, Jr.
Attorney, Agent, or Firm—Donald C. Feix

[57] ABSTRACT

A dye laser is stabilized for operation at a narrow line width by a control system which utilizes two reference interferometers.

One reference interferometer has a small free spectral range for stabilizing the frequency of operation of the dye laser at the relatively narrow line width, and the other reference interferometer has a free spectral range substantially larger than the first reference interferometer.

The dye laser is servo locked to a side of a transmission fringe of the first reference interferometer to maintain operation at a selected frequency with the narrow line width in the absence perturbations that can cause a mode hop.

When a perturbation does cause a mode hop, the second reference interferometer detects the extent and the direction of the mode hop. It then automatically stops the scanning system of the dye laser, resets the servo back to the selected frequency and restarts the scanning system of the dye laser in operation at the selected frequency, all within a short period of time.

11 Claims, 6 Drawing Figures

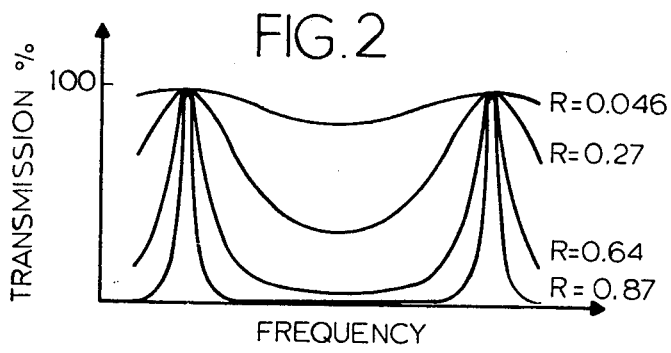
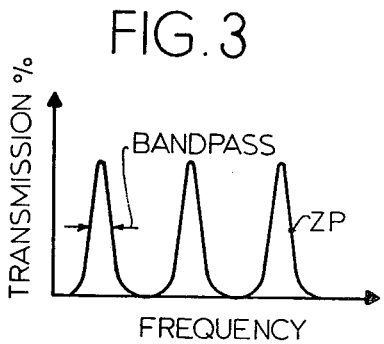
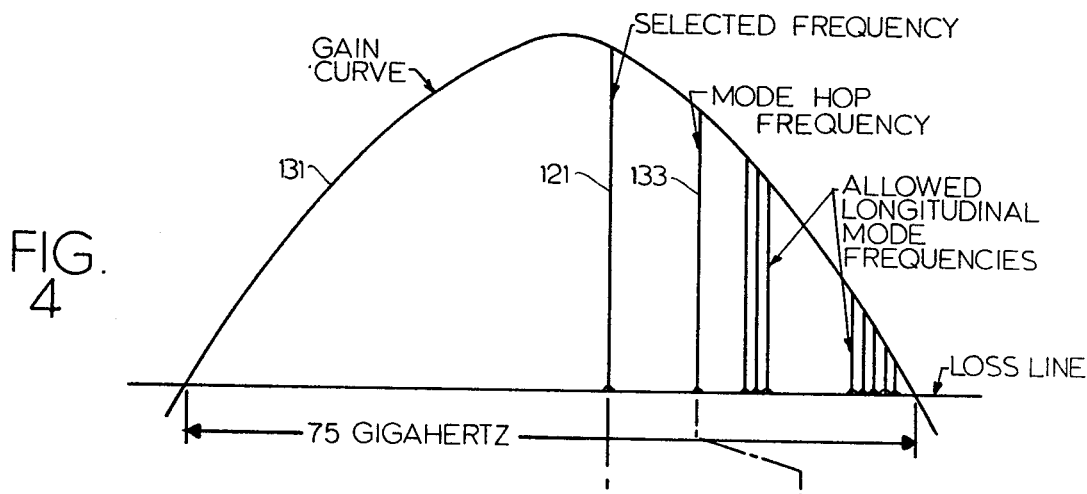
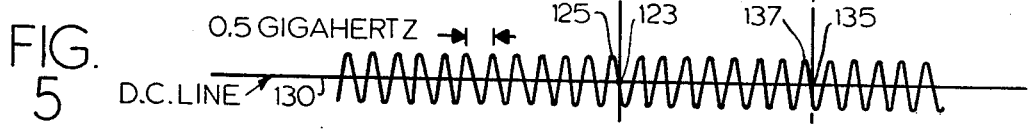
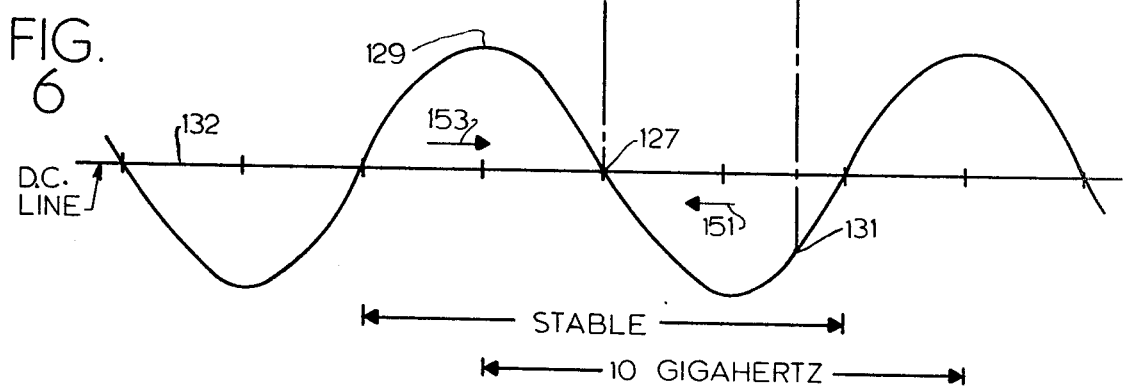

DUAL REFERENCE INTERFEROMETER FOR DYE LASER STABILIZATION

BACKGROUND OF THE INVENTION

This invention relates to methods and apparatus for stabilizing the frequency of continous wave dye lasers and continous wave ring dye lasers.

Commercially available dye lasers can produce a line width in the order of 10 megahertz and a drift in the order of 10 megahertz per minute. However, this is not good enough for a great deal of spectroscopic work; and more narrow line widths are often required.

In theory, a dye laser operating in a single mode should produce a pure sine wave with an infinitesimal line width at the particular optical frequency of operation. However, in actual operation the line width is determined by a number of things including, mechanical jitter of the laser, variations in the optical path caused by acoustical waves, variations in the optical path caused by the dye jets in the dye laser, and other factors. Thus, while it has been desired to control the line width to 1 megahertz or less, achieving such narrow line widths has been difficult to do.

In attempts to achieve small line widths the prior art has, in general, tried to servo control the dye laser head by using a reference which is more stable than the dye laser head. A reference Fabry-Perot interferometer has been used for this purpose. In prior art systems of this kind a small part of the light output of the dye laser is directed through the interferometer to provide an output signal which changes in amplitude with a change in frequency of the dye laser. The reference interferometer thus changes frequency modulation into amplitude modulation. The amplitude change can be detected photoelectrically and has been used as part of a servomechanism to control the output frequency of the laser. The output frequency of the dye laser can thus be made characteristic of the reference interferometer rather than the laser head of the dye laser.

The goal then, with the reference interferometer control of this kind, has been to have the frequency stability of the laser head characteristic of the reference interferometer, because the interferometer usually can be smaller, more compact and more effectively environmentally sealed than the laser head itself, principally because of the smaller size of the reference interferometer.

There are two features of a reference interferometer that usually characterize the frequency stability of a servo system of this kind.

These features are the finesse and the free spectral range of the reference interferometer.

The free spectral range is generally determined by the length of the interferometer and gives the equivalent frequency difference between successive passbands of the interferometer.

The finesse is used as a measure of the resolution of a Fabry-Perot interferometer and is equal to the ratio of the separation between peaks to the width of a transmission bandpass. The width of a bandpass is measured at one half the maximum amplitude. The actual shape of the transmission curve of a Fabray-Perot interferometer is given by what is known as the Airy function, and the finesse is dependent in large measure on the reflectivity of the mirrors used. The finesse increases as the mirror reflectivity increases.

To stabilize the dye laser head to the reference interferometer one servo locks to a side of a transmission fringe of the reference interferometer with a zero for the error signal usually located approximately halfway up the fringe. Either the reference interferometer is tuned or the dye laser is tuned until the lock on the side of the fringe is made in this area. Thereafter a small change in frequency in the dye laser leads to a relatively large change in the amplitude transmitted through the reference interferometer.

To get the narrowest line width it is generally desired to use the smallest free spectral range for the reference interferometer because the line width that can be achieved by locking is determined in part by the free spectral range of the interferometer. A smaller free spectral range of the reference interferometer will enable the dye laser to produce a narrower line.

However, as the free spectral range of the reference interferometer is reduced, the system becomes less stable with respect to locking to successive passbands of the reference interferometer. That is, because the dye laser is tunable and can oscillate in a large number of possible modes, reducing the free spectral range of the reference interferometer increases the possibility that the dye laser can mode hop to one of the other permitted frequencies of oscillation and that the new frequency can lock on a side of a different transmission fringe of the reference interferometer without causing a noticeable change in the amplitude of the output signal of the reference interferometer.

Thus, using a reference interferometer with smaller free spectral ranges in order to stabilize the dye laser at a narrower line width actually increases the chances for an undetected mode hop. Attempting to provide a more stable reference can result in the reference becoming less stable.

The reason that a dye laser can hop like this is due to perturbations. These normally arise due to bubbles in the jet stream of the dye laser, but they can arise from other causes also.

In the event of a perturbation, the laser blinks out momentarily and comes back on. It may come back on at the same frequency or it may come back on at a different cavity resonance frequency.

SUMMARY OF THE INVENTION

It is a primary object of the present invention to overcome the stability problems incurred in stabilizing a dye laser at a narrow line width.

The present invention incorporates a dual reference interferometer control apparatus and method for controlling the frequency of operation of a continuous wave dye laser. After the dye laser has been set into operation in a single mode at a selected frequency, a first reference interferometer having a small free spectral range and low to medium finesse is used to stabilize the frequency of operation of the dye laser at a relatively narrow line width. A servomechanism is operatively associated with the first reference interferometer to lock the dye laser to a side of a transmission fringe of the reference interferometer and to maintain the lasing operation at the selected frequency in the absence of perturbations that can cause a mode hop in the dye laser.

A second reference interferometer is operatively associated with the first reference interferometer and the servomechanism for detecting a mode hop in the dye laser and also the extent and the direction of the mode hop. The second interferometer has a low to medium finesse and has a free spectral range which is substantially larger than that of the first reference interferometer so that any mode hop which might go undetected by the first reference interferometer will show up as a change in the amount of light transmitted through the second reference interferometer. The second interferometer, in the event of a mode hop, stops the scanning system of the dye laser, drives the servomechanism back to produce the original selected frequency and then restarts the scanning system of the dye laser in operation at the selected frequency, all in a relatively short period of time.

The present invention also normalizes the output of the reference interferometer to the input so that changes in intensity of the light output of the dye laser do not introduce an error in the gain of the servo loop. The servo loop gain remains independent of the intensity of the dye laser beam.

Dual reference interferometer control apparatus and methods which incorporate the structures and techniques described above and which are effective to function as described above constitute specific objects of this invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 2 is an Airy function graph showing how the transmission characteristics of a Fabry-Perot interferometer or etalon varies as a function of the reflectance (R) of the mirrors used in the etalon. The definition of the fringes and the finesse (F) increase with increasing reflectance of the mirrors.

FIG. 3 is an Airy function graph like FIG. 3 but restricted to an etalon having a given mirror reflectance. FIG. 3 also graphically illustrates how two important characteristics—the free spectral range (FSR) and the finesse (F)—are related to the mirror spacing (L) and the mirror reflectivity (R). FIG. 3 also illustrates how a servo lock is made by using the side of a transmission fringe with the zero point for the error signal located approximately halfway up the fringe (at the point ZP in FIG. 3) so that changes in frequency from this zero point produce a corresponding change in the amplitude in the light transmitted through the etalon.

FIG. 4 is a gain curve showing, for purposes of example, a few of the allowed longitudinal mode frequencies which can be produced in a dye laser having a given intracavity spacing and a fixed tuning element, such as a birefringent filter, for producing an initial restriction on the range of allowed frequencies of oscillation. In the particular embodiment illustrated in FIG. 4 having a 75 gigahertz range the dye laser could operate, without scanning, at frequencies of every 210 megahertz (assuming that the dye laser is not being scanned). Only a few of the 357 allowed frequencies are shown in FIG. 4. FIG. 4 also illustrates how a perturbation in the dye laser can cause the dye laser to make a mode hop from a selected frequency to another frequency (mode hop frequency) of one of the allowed longitudinal mode frequencies under the gain curve.

FIG. 5 is an Airy function plot of a first reference interferomter incorporated in the control apparatus shown in FIG. 1. FIG. 5 is drawn to a larger horizontal scale than FIG. 4. As shown in FIG. 5 the first reference interferometer has a relatively small free spectral range for stabilizing the frequency of operation of the dye laser at a relatively narrow line width. In the particular embodiment illustrated in FIG. 5 the reference interferometer has a free spectral range of 0.5 gigahertz and thus could provide about 150 peaks in the 75 gigahertz range under the gain curve of FIG. 4. FIG. 5 illustrates how the lock on a selected frequency can be re-established by the first reference interferometer on the mode hop frequency without producing any change in the observed amplitude of transmission through the first reference interferometer.

FIG. 6 is an Airy function plot of a second reference or slave interferometer used in the control apparatus shown in FIG. 1. In the particular embodiment illustrated in FIG. 6 the interferometer has a free spectral range of 10 gigahertz. FIG. 6 is aligned in vertical registry with FIG. 5 and illustrates how the substantially larger free spectral range of the second interferometer causes a mode hop to produce a change in the light transmitted through the second reference interferometer which indicates both the extent of the mode hop and the direction of the mode hop from the selected frequency.

DESCRIPTION OF THE PREFERRED EMBODIMENTS

Figure 1:
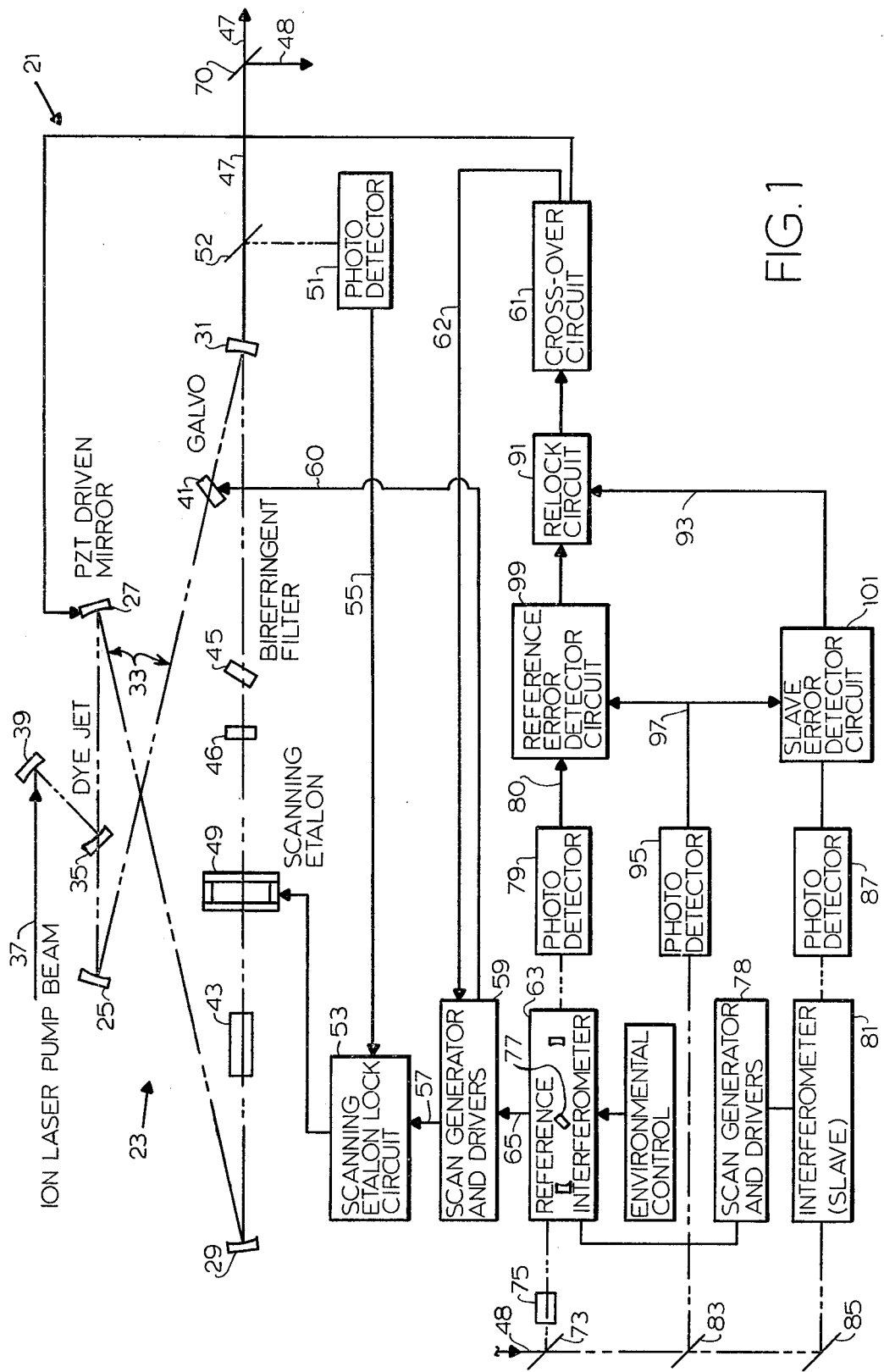
FIG. 1 is a block diagram showing the principal components of a dual reference interferometer control apparatus constructed in accordance with one embodiment of the present invention.

A dual reference interferometer control apparatus constructed in accordance with one embodiment of the present invention is indicated generally by the reference numeral 21 in FIG. 1.

The control apparatus 21 stabilizes the operation of a dye laser 23. In the specific embodiment of the invention shown in FIG. 1 the dye laser 23 is a continuous wave ring dye laser, but the present invention is applicable to all dye lasers of the continuous wave type.

The laser 23 includes mirrors 25, 27, 29 and 31 which form a resonator cavity.

The beam path within the cavity is indicated by the reference numeral 33.

The laser active medium is disposed in the beam path 33 by a dye jet 35. The dye jet 35 forms a flowing jet of a suitable dye (such as, for example, rhodamine 6 G dissolved in ethylene glycol) in the resonator beam path 33.

An ion laser pump beam 37 is directed into the dye jet by an injection mirror 39.

The dye laser 23 is smoothly tuned by a piezoelectrically actuated drive for the mirror 27 and by a galvanometer controlled Brewster angle window 41 over typically 30 gigahertz. The galvanometer control of the Brewster angle window 41 forms a part of a slow loop of a servo control for the tuning. There are two servo loops on the piezoelectrically driven mirror 27—an intermediate speed loop and a fast speed loop.

The other components of the servo system associated with the mirror 27 and the window 41 will be described in more detail below.

The particular laser 23 shown in FIG. 1 is gross tuned by a birefringent filter 45, and a fine etalon 46 provides a further restriction on the band width of frequencies which can be selected by the adjustable tuning means of the dye laser. The principal function of the fine etalon 46 is to prevent scanning etalon mode hops which are outside the frequency excursion permitted by the etalon 46. In one specific embodiment the fine etalon 46 restricts the band width to 75 gigahertz.

The dye laser 23 is operated as a ring laser by means of a unidirectional device 43. In a particular embodiment of the present invention the unidirectional device 43 includes a Faraday effect direction selector. The effect of the unidirectional device 43 produces a small differential loss in one direction of travel of the two possible counter rotating traveling wave modes in the ring cavity. This selects the direction of the travel of the beam and causes the other direction of travel to be extinguished. The unidirectional device 43 is described in detail in co-pending U.S. application Ser. No. 854,514 filed Nov. 25, 1977 by Jarrett, et al and assigned to the same assignee as the present application.

The output of the laser 23 passes through the mirror 31 along the beam path 47.

As illustrated in FIG. 1, a scanning etalon 49 may be used with the dye laser 23 for the usual scanning operation of the dye laser. The dimension of the scanning etalon 49 is varied by a piezoelectric drive under the control of a scanning etalon lock circuit 53.

A photodetector 51 is associated with the output beam 47 by a partially reflecting mirror 52 to measure the intensity of the output beam, and this intensity signal is supplied from the photodetector 51 to the scanning etalon lock circuit 53 over a line 55. This circuit locks the scanning etalon 49 to a dye laser cavity mode.

As will be described in greater detail below, the intensity of the output beam as measured by another photodetector 95 is also supplied to a normalizing circuit for the two reference interferometers.

With continued reference to FIG. 1 the scanning etalon lock circuit 53 receives another signal input on a line 57 from a scan generator and drivers circuit 59.

The scan generator and drivers circuit 59 is also connected to the galvanometer controlled Brewster angle window 41 through a line 60.

The scan generator and drivers circuit 59 receives one input from a crossover circuit 61 over a line 62 and a second input from a first reference interferometer 63 over a line 65.

The light for the reference interferometer 63 is obtained from the outbeam 47 by deflecting a beam 48 by mirrors 70 and 73. The mirror 73 directs a light beam to the input of the reference interferometer 63.

As illustrated in FIG. 1, the reference interferometer 63 includes a tuning element in the form of a galvanometer control Brewster angle window 77 for tuning of the reference interferometer. In a specific embodiment of the invention a second reference or slave interferometer 81 includes a piezoelectric drive for positioning the mirrors of the slave interferometer for tuning. The galvanometer drive of the inteferometer 63 and the piezoelectric drive of the interferometer 81 are controlled by a scan generator and drivers circuit 78 to scan the two interferometers in synchronism.

The output of the reference interferometer 63 is measured by a photodetector 79, and the output of the photodetector 79 as transmitted on a line 80 and line 62 to the scan generator and drivers circuit 59 is used to control the positioning of the Brewster angle window 41 through the galvanometer drive and the positioning of the mirror 27 through the piezoelectric drive.

The initial tuning of the dye laser 23 for operation in a single mode at a selected frequency (with or without scanning by the scanning etalon 49) is generally like that used with prior art reference interferometer controls for stabilizing dye lasers. That is, the tuning of the dye laser is locked to the reference interferometer through the related servomechanisms as noted above in this application under the heading "Background of the Invention."

The present invention differs from the prior art by associating the slave interferometer 81 with the first reference interferometer 63 and the dye laser 23 to perform a number of important functions.

As shown in FIG. 1, a portion of the light reflected from the mirror 73 passes through a metalized mirror 83 and is directed by a mirror 85 into the input of the slave interferometer 81. The output of the slave interferometer 81 is measured by a photodetector 87, and the photodetector 87 is connected by a line 89 to a slave error detector citcuit 101 and then to a relock circuit 91 over a line 93.

The mirror 83 directs a part of the light from the beam 48 to a photodetector 95, and the output of the photodetector 95 is connected by a line 97 to the inputs of the error detector circuits 99 and 101. Each error detector circuit normalizes the output of its associated reference interferometer to prevent changes in intensity of the light output of the laser 23 from affecting the operation of the reference interferometer controlled servo driven tuning mechanism.

Since the interferometer 63 measures the frequency of operation of the dye laser 23 by producing an amplitude signal related to the frequency, a change in intensity of the laser beam could, by itself, produce an amplitude change in the output of the photodetector 79 which would be indistinguishable from an amplitude change in the output of the photodetector resulting from a frequency change in the operation of the dye laser.

Each error detector circuit includes an analog multiplier/divider chip, a difference amplifier, and four resistors associated with the difference amplifier and the light intensity signals on the lines 80 and 97 to normalize the changes in amplitude which can be produced by changing intensities of the beam path 33 of the gas laser.

These circuits insure that the servo loop gain is independent of the intensity of the laser beam itself. This stabilizes the servo gain loop so that the gain of this loop does not have to be changed as the intensity of the laser varies.

The reference interferometer 63 has a relatively small free spectral range so that servo locking the dye laser 23 to the side of the transmission fringe of this reference interferometer provides a quite narrow line width for the output beam 47.

The slave interferometer 81 has a free spectral range which is substantially larger than that of the reference interferometer 63. The dye laser 23 is also set to a certain point on a side of a transmission fringe of the slave interferometer when the dye laser is tuned to operate in a single mode at a selected frequency. This is done in an initialization procedure performed before the system becomes actively stabilized. The system 21 is then turned on, and it becomes active.

This association of the two reference interferometers with the operation of the dye laser in a single mode at a selected frequency is graphically illustrated in FIGS. 4 through 6.

In the particular embodiment of the reference interferometer represented in FIG. 5, the free spectral range is approximately 0.5 gigahertz.

FIG. 6 shows a specific embodiment of the invention in which the free spectral range of the slave interferometer 81 is approximately 10 gigahertz for convenience of optical design. In a specific embodiment of the invention a confocal type interferometer was used to produce this free spectral range. A plane parallel interferometer can be used to provide a larger free spectral range, for example, a free spectral range of about 70 gigahertz.

Both reference interferometers preferably have a low to medium finesse in the range of 2 to 4.

As illustrated in FIG. 4, the dye laser 23 has been tuned to operate in a single mode at a selected frequency 121.

In this condition of operation the piezoelectric driven mirror 27 and the galvonometer driven window 41 are connected (through the circuit components 61, 91, 99, 79, 101, 87 and 59 shown in FIG. 1) to both the reference interferometer 63 and the slave interferometer 81. The servo lock to the reference interferometer is represented by the point 123 on a side of a transmission fringe 125 in FIG. 5 and lying on a direct current line 130 midway between the peak and valley of a fringe. A change in frequency of the dye laser (other than a controlled change of frequency produced by normal scanning operation of the scanning etalon 49) of the dye laser in one direction, say, for example, a lowering of the frequency, increases the amplitude of the light transmitted through the reference interferometer 63 to produce an output above the zero point represented by the line 130, and a change in frequency in the other direction produces an output below the line 130. However, a smooth, continuous change of frequency as produced by normal scanning operation of the scanning etalon 49 does not change the amplitude of the output of either reference interferometer because the circuits 53, 59 and 78 cause the reference interferometers to scan in synchronism with the scanning etalon 49 during such normal operation.

The reference to the slave interferometer 81 is indicated by the point 127 on the side of a transmission fringe 129 in FIG. 6 and lying on the direct current line 132.

Thus, with the servo lock to the reference interferometer at 123 as shown in FIG. 5 any small, unintended change or drift in frequency of operation of the dye laser produces an appreciable change in the amplitude of the light transmitted through the first reference interferometer 63, but only a small change in the amplitude of the slave interferometer 81 (because of the larger free spectral range of the slave interferometer). So, during normal operation, and in the absence of a perturbation which could cause a mode hop in the dye laser, the reference interferometer 63 is in control and maintains the line width of the output beam 47 within quite narrow limits, for example, one megahertz or less. In this normal mode of operation of the dye laser, the slave interferomter 81 is not particularly significant, because the reference interferometer 63 provides a finer and more responsive control action.

In the event of a perturbation, however, the dye laser 23 can undergo a mode hop from the selected frequency 121 to any one of a number of other allowed longitudinal mode frequencies under the gain curve 131 shown in FIG. 4 and within any more restricted band width as provided by the fine etalon 46 and birefringement filter 45. Depending upon the spacing between the allowed frequencies and the size of the free spectral range of the reference interferometer 63 the dye laser can make a mode hop to certain ones of the allowed frequencies and can relock to a side of a transmission fringe of the reference interferomter 63 without any observable change in amplitude from the output of the reference interferometer 63. With the specific embodiments illustrated in FIGS. 4 and 5, the dye laser 23 oscillates at frequencies spaced 210 megahertz apart; so the dye laser could conceivably lock on every second transmission fringe of the reference interferometer 63 when it has a free spectral range of about 0.5 gigahertz as illustrated.

One possible mode hop is illustrated in FIGS. 4, 5 and 6 where the dye laser has, as a result of a perturbation, made a mode hop from the selected frequency 121 to another (mode hop) frequency 133.

As shown in FIG. 6 this mode hop frequency 133 can servo lock at a point 135 to a side of a transmission fringe 137 in a way that produces exactly the same amplitude of light output from the reference interferometer 63 as was produced by the lock to the fringe 125 at the point 123.

Under these conditions of operation the reference interferometer 63 cannot provide any discriminating function, and the attempt to stabilize the dye laser at a selected frequency 121 with a narrow line width at that selected frequency could be completely defeated and also completely undetected.

It is at this point that the slave inteferometer 81 becomes significant.

As can be seen by looking at FIG. 6 a shift from the frequency 121 to the frequency 133 in FIG. 4 produces a substantial change in the amplitude of the light transmitted through the slave interferometer 81, as indicated by the location of the point 139 in FIG. 6. The point 139 is below the line 132, and it is to the right (as viewed in FIG. 6) of the reference point 127.

Under this condition of operation, the reference interferometer 81 supplies a signal to the relock circuit 91 which stops the scanning system of the dye laser 23 and locks the slave interferometer curve in time. The location of the point 139 below the line 127 (and within the stable region of the slave interferometer 81 as indicated by the corresponding legend in FIG. 6) supplies a signal to the relock circuit that the servo must be driven in the direction indicated by the arrow 151. (If the mode hop had caused a shift to a point on the fringe curve located above the line 132, then the servo would be driven in the direction of the arrow 153.) The relock circuit 91 then drives the galvanometer window 41 back to a position to re-establish the selected frequency 121. The slave interferometer and relock circuit then restart the scanning system of the dye laser in operation at the selected frequency 121 with the tuning components servo locked to the refrence interferometer 63 as described above. In a specific embodiment this detection of a mode hop, correction and restart are accomplished in about ten to fifteen microseconds.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A dual reference interferometer control apparatus for detecting and controlling the frequency of operation of a laser, said control apparatus comprising, a continuous wave dye laser, having a resonant laser cavity, capable of lasing in a plurality of modes, tuning means for restricting lasing to a single mode at a selected frequency, first reference interferometer means having a relatively small free spectral range for stabilizing the frequency of operation of the dye laser at a relatively narrow line width, servo means operatively associated with the first reference interferometer means and the tuning means for servo locking the tuning means to a side of a transmission fringe of the first reference interferometer to maintain lasing operation at the selected frequency in the absence of perturbations that can cause a mode hop in the dye laser cavity, and second reference interferometer means having a free spectral range substantially larger than the first reference interferometer and operatively associated with the first reference interferometer means and the servo means for detecting a mode hop in the dye laser cavity and the extent and direction of the mode hop and effective, in the event of a mode hop, to return dye laser to operation at the selected frequency.

2. The invention defined in claim 1 wherein both first reference interferometer means and the second reference interferometer means are located externally of the dye laser cavity.

3. The invention defined in claim 1 wherein the continuous wave dye laser is a ring laser.

4. The invention defined in claim 1 wherein the first reference interferometer means have a free spectral range of about 0.5 gigahertz and the second reference interferometer means have a free spectral range which is more than ten times as large as the free spectral range of the first reference interferometer means.

5. The invention defined in claim 4 wherein the second reference interferometer means include a confocal interferometer.

6. The invention defined in claim 4 wherein the second reference interferometer means include a plane parallel interferometer.

7. The invention defined in claim 1 including light normalizing means for normalizing the output of the reference interferometers with changes in intensity of the light produced by the dye laser to prevent a change in the intensity of the light produced by the dye laser from affecting the control signals supplied to the servo means by the reference interferometer means.

8. The invention defined in claim 1 wherein both reference interferometers are low finesse interferometers each having a finesse in the range of 2 to 4.

9. The invention defined in claim 1 including a scanning etalon within the dye laser cavity, scanning means in each reference interferometer for scanning the frequency of operation, scanning control means for causing the scanning etalon and scanning means in the reference interferometers to scan in synchronism, and relock means operatively associated with the second reference interferometer for freezing scanning upon detection of a mode hop and wherein the servo means reset the tuning means to operate at the selected frequency as scanned just prior to the mode hop and then restart scanning at that frequency.

10. A method of detecting and controlling the frequency of operation of a continuous wave dye laser of the kind having a dye laser cavity capable of producing lasing operation in a plurality of modes, said method comprising, tuning the dye laser cavity to lase in a single mode at a selected frequency, monitoring the lasing with a first reference interferometer having a relatively small free spectral range, monitoring the lasing with a second reference interferometer having a free spectral range substantially larger than that of the first reference interferometer, locking the frequency to a side of a transmission fringe of the first reference interferometer to maintain lasing at the selected frequency in the absence of perturbations that can cause a mode hop in the dye laser cavity, detecting a mode hop in the dye laser cavity and the extent and direction of the mode hop by a change in the transmission through the second reference interferometer, retuning the dye laser cavity in response to the extent of mode hop and the direction of the mode hop as detected by the second reference interferometer to re-establish and to re-lock to the selected frequency, and continuing the lasing at the selected frequency.

11. The invention defined in claim 10 including scanning the dye laser and both reference interferometers in synchronism, stopping scanning in the event of a mode hop and resuming scanning after the dye laser has returned to operation at the selected frequency.

* * * * *